United States Patent Office 3,294,745
Patented Dec. 27, 1966

---

3,294,745
INTERPOLYMERS FROM HALOARYL
PHOSPHOROUS THIODIHALIDE
Marco Wismer, Gibsonia, Pa., assignor to Pittsburgh Plate Glass Company, Pittsburgh, Pa., a corporation of Pennsylvania
No Drawing. Filed Feb. 16, 1962, Ser. No. 173,823
10 Claims. (Cl. 260—47)

This invention relates to novel monomers and interpolymers, and pertains more specifically to monomers obtained by the reaction of halogenated mononuclear aromatic compounds with phosphorus trihalides and sulfur, and to interpolymers of such novel monomers with polyhydroxy aromatic compounds.

It has been discovered that halogenated mononuclear aromatic compounds having at least one carbon atom of the aromatic ring available for reaction will react with phosphorus trihalides and sulfur in the presence of a Friedel-Crafts catalyst to give novel monomeric compounds substantially in accordance with the following equation:

(1)

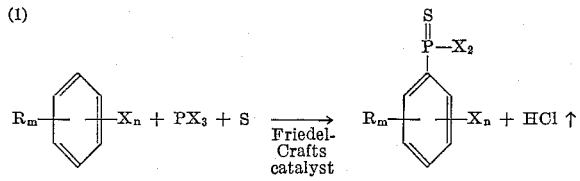

wherein X is a halogen radical selected from the class consisting of chlorine, bromine and fluorine, R is an alkyl group containing from about 1 to 6 carbon atoms, $n$ is a whole number from 1 to 5, and $m$ is a whole number equal to one or zero, and the sum of $m$ plus $n$ does not exceed 5.

For example, when monochlorobenzene and phosphorus trichloride are utilized along with sulfur as the reactants, the resulting product is monochlorophenyl phosphorus thiodichloride.

The product depicted above will condense with non-adjacent polyhydroxy aromatic compounds, liberating hydrogen chloride and forming resins of the linear polymer type, when mixtures of these compounds are subjected to elevated temperatures. Resinous materials produced from the hereinabove described monomers have excellent fiber-forming properties.

The reaction for producing the linear type polymer may be illustrated by the following equation, wherein p-chlorophenyl phosphorus thiodichloride and 2,2-bis(4-hydroxyphenyl)propane are utilized as illustrative reactants:

(2)

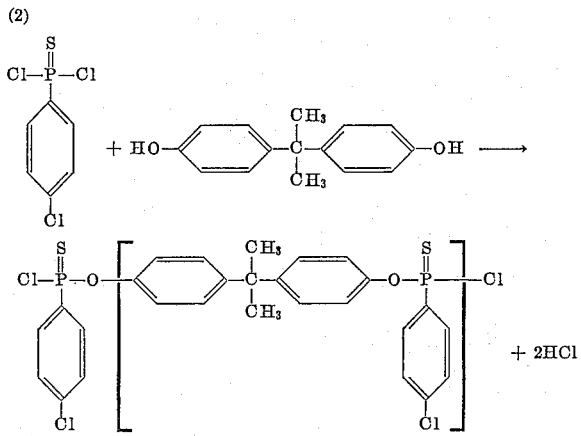

wherein the bracketed portion of the structure is the repeating unit.

The novel haloaryl phosphorus thiodihalide monomers described herein can be prepared as depicted in reaction (1) above wherein the halogenated mononuclear aromatic compound utilized as one of the reactants may be monochlorobenzene, monobromobenzene, monofluorobenzene, dichlorobenzene, trichlorobenzene, tetrachlorobenzene, pentachlorobenzene, dibromobenzene, tribromobenzene, tetrabromobenzene, pentabromobenzene, difluorobenzene, trifluorobenzene, tetrafluorobenzene, pentafluorobenzene, monochlorotoluene, monobromotoluene, monofluorotoluene, dichlorotoluene, trichlorotoluene, tetrachlorotoluene, dibromotoluene, tribromotoluene, tetrabromotoluene, difluorotoluene, trifluorotoluene, tetrafluorotoluene, monochloroethylbenzene, monochloropropylbenzene, monochlorobutylbenzene, monochloroamylbenzene, monochlorohexylbenzene, monobromoethylbenzene, dibromoethylbenzene, tribromoethylbenzene, tetrabromoethylbenzene, difluoropropylbenzene, difluorobutylbenzene, difluoroamylbenzene, difluorohexylbenzene, and the like, and wherein the phosphorus trihalide may be phosphorus trichloride, phosphorus tribromide or phosphorus trifluoride.

The reaction of a haloaryl compound with a phosphorous trihalide and sulfur in accordance with this invention can readily be effected by heating a mixture of the reactants in the presence of a Friedel-Crafts catalyst such as aluminum chloride, ferric chloride, stannic chloride, boron trifluoride, zinc chloride, antimony pentachloride, titanium chloride, hydrofluoric acid, sulfuric acid, phosphoric acid, phosphorous pentoxide, bismuth chloride and tellurium di- and tetrachlorides and the like. The Friedel-Crafts catalysts are discussed in detail in volume 3 of Organic Reactions (1946), pages 2 to 4.

One preferred method of producing the hereinabove described novel haloaryl phosphorous thiodihalides comprises reacting an excess of a phosphorous trihalide with a haloaryl compound in the presence of a Friedel-Crafts catalyst at temperatures of about 60° C. to 90° C., although temperatures of 35° C. or lower to 120° C. or higher can also be utilized. The product of this reaction is a haloaryl phosphorous dihalide. Sulfur is then added to the reaction mixture and exothermally reacts with the haloaryl phosphorous dihalide to form a haloaryl phosphorous thiodihalide.

As indicated in the graphically represented reaction hereinabove, equimolar quantities of reactants are required stoichiometrically to produce an equivalent number of moles of the haloaryl phosphorous thiodihalide. However, no particular ratio of reactants is required to effect the reaction or reactions. Thus, any one or two, of the reactants may be used in excess of 5 to 1, or higher, in relation to the remaining reactants or reactant.

The quantity of Friedel-Crafts catalyst utilized is not critical and may be varied widely. In general, it is preferable to employ form about 10 percent to 200 percent by weight of catalyst based on the total weight of the haloaryl reactant. Amounts of catalyst smaller than 10 percent or larger than 200 percent, however, may be utilized if desired.

Recovery of the desired product from the reaction mixture can be accomplished by the following procedure:

(1) Distilling the mixture at reduced pressure to remove excess phosphorous trihalide,
(2) Washing the distilland with ice water to remove residual Friedel-Crafts catalyst,
(3) Solubilizing with a solvent such as lactol spirits of naphtha, monohalobenzene, and the like.
(4) Washing of the solution with water, accompanied by phase-separation of the solution-phase from the water-phase, (5) Drying with calcium chloride or similar desiccant,
(6) Filtering of the solution, and
(7) Distilling.

The oily product obtained by the above procedure may be further purified by fractional distillation at reduced pressure, thereby yielding pure haloaryl phosphorous thiodihalide in liquid form.

While the above described method for recovering the reaction product is very effective, other methods of recovering the product, for example, selective solvent extraction, may be employed if desired.

The haloaryl phosphorous thiodihalide compounds produced by the above procedure are useful as monomers which can be condensed with non-adjacent polyhydroxy aromatic compounds liberating hydrogen halide and forming resins from which fine fibers of remarkable strength can be drawn.

The condensation type polymerization of the hereinabove described monomers generally requires the exposure of the admixed monomers to elevated temperatures, about 70° C. to about 220° C., for a prolonged period of time, approximately 70 hours to 150 hours. The utilization of reduced pressure, down to 2 millimeters of mercury, during the condensation reaction is advantageous. The solid reaction product which is obtained may be purified by the following procedure, although other procedures may be also utilized:

(1) Solubilization in a suitable solvent such as acetone, toluene, and the like,
(2) Filtration to remove non-soluble matter, and
(3) Recovery of a solid resinous product by removal of the solvent by distillation or evaporation.

Among the non-adjacent polyhydroxy aromatic monomers which can be polymerized with the haloaryl phosphorous thiodihalides obtained by the reaction of this invention, are the following:

(a) Non-adjacent polyhydroxy mononuclear aromatic hydrocarbons such as resorcinol, methylresorcinol, hexylresorcinol, hydroquinone, phloroglucinol, and the like;

(b) Non-adjacent polyhydroxy aromatic compounds with condensed ring systems such as 1,4-dihydroxynaphthalene, 1,5-dihydroxynaphthalene, 1,7-dihydroxynaphthalene, 9,10-dihydroxyanthracene, 1,3,6-trihydroxynaphthalene, and the like;

(c) Polyhydroxy aromtic compounds with separated ring systems such as 2,2-bis(4-hydroxyphenyl)propane, 1,1 - bis(4 - hydroxyphenyl)ethane, 1,1-bis(4 - hydroxyphenyl)isobutane, 2,2-bis(4-hydroxyphenyl)butane, 2,2-bis(4 - hydroxy-2-methylphenyl)propane, 2,2 - bis(4 - hydroxy - 2 - tertiarybutylphenyl)propane, bis(2 - hydroxynaphthyl)methane, 4,4'-dihydroxybenzophenone, 4,4'-hydroxydiphenyl, 4,4'-hydroxy-3,3'-methylidiphenyl, 4,4'-hydroxy-3,3'-propyldiphenyl, 4,4'-hydroxy-3,3'-isopropyldiphenyl, 4,4'-hydroxy-3,3'-butyldiphenyl, and the like.

The following examples illustrate in detail the preparation of novel haloaryl phosphorous thiodihalide monomers, and the polymerization of such monomers to form interpolymers. The examples are not intended to limit the invention, however, for there are, of course, numerous possible variations and modifications.

*Example I*

The following ingredients were admixed in a flask equipped with a stirrer, thermometer and condenser:

|  | Grams |
|---|---|
| Monochlorobenzene (2.40 gram-moles) | 270.0 |
| Phosphorous trichloride (5.85 gram-moles) | 806.0 |
| Aluminum chloride (2.40 gram-moles) | 320.0 |

The above mixture was agitated and heated at reflux temperature, about 70° C. to 80° C. for about 5 hours. Hydrogen chloride gas rapidly evolved during this period. The resulting homogeneous, clear yellow mixture was then cooled to approximately 30° C. Eighty (80) grams of sublimed sulfur were added to the mixture. The reaction mixture then exothermed to 71° C. and turned orange in color. The mixture was heated to a temperature of 80° C. and held at this temperature for a period of 3 to 4 minutes.

The resulting mixture was distilled at reduced pressure and a pot temperature of 75° C. to 80° C. for 30 minutes to remove excess phosphorus trichloride, after which the residual aluminum chloride was removed by washing the distilland with ice water. The product was then extracted with lactol spirits of naphtha. The naphtha solution was washed several times with water, phase-separated from the water, dried over calcium chloride and filtered; yielding a colorless, clear solution.

The naphtha solvent was removed by distilling the clear solution obtained above at reduced pressure. One hundred and thirteen and eight-tenths (113.8) grams of a yellow, hazy, oily product were obtained.

The product was further purified by distillation wherein the fraction boiling above 107° C., vapor temperature, at 0.8 millimeter of mercury, was retained and redistilled. From the second distillation the fraction which boiled between 103.5° C. and 104.5° C., vapor temperature, at 0.7 millimeter of mercury, was retained and further distilled. From the third distillation the fraction which boiled between 106.0° C. and 108.0° C., vapor temperature, at a pressure of 0.6 millimeter of mercury, was collected as product. The total weight of this fraction was 16.6 grams.

A microanalysis of the product was compared with the theoretical composition of monochlorophenyl phosphorus thiodichloride, as indicated below:

|  | Percent Carbon | Percent Hydrogen | Percent Chlorine | Percent Sulfur | Percent Phosphorous |
|---|---|---|---|---|---|
| Theoretical Value | 29.33 | 1.64 | 43.35 | 13.05 | 12.61 |
| Experimental Value | 29.10 | 1.46 | 43.20 | 13.30 | 12.47 |
| Do | 29.19 | 1.58 | 43.42 | 13.36 | 12.54 |

*Example II*

One hundred thirty four and five-tenths (134.5) grams (0.55 gram-mole) of material, prepared in the manner of Example I and identified as monochlorophenyl phosphorus thiodichloride, were admixed with 114.0 grams (0.5 gram-mole) of 2,2-bis(4-hydroxyphenyl)propane in a glass vessel equipped with stirrer, thermometer, inert gas purge and reflux condenser.

The mixture was heated and stirred for 52 hours at atmospheric pressure, resulting in the evolution of hydrogen chloride gas. The temperature was elevated from 130° C. to 180° C. during this time.

For an additional 92 hours the mixture was heated and stirred under reduced pressure, 10 millimeters of Hg to 2 millimeters of Hg. Hydrogen chloride gas continued to evolve and the temperature was elevated from 200° C.

to 220° C. The heating was then discontinued and the reaction product was allowed to cool.

The solid reaction product was solubilized with acetone and filtered. The acetone solvent was evaporated, leaving a solid resinous residue having a softening point of 55° C. At 80° C. it was a viscous liquid having sufficient cohesiveness to cure a thin filament to be drawn from the surface of the material. At 87° C. the copolymer was very soft and at 120° C. it was liquid.

*Example III*

The following ingredients were admixed in a flask equipped with a stirrer, thermometer and condenser:

|  | Grams |
| --- | --- |
| Monobromobenzene (1.0 gram-mole) | 157.0 |
| Phosphorus trichloride (3.0 gram-mole) | 413.0 |
| Aluminum chloride (1.0 gram-mole) | 133.3 |

The above mixture was agitated and heated at reflux temperature, about 80° C., for about 8 hours. Hydrogen bromide gas rapidly evolved during this period. The mixture was then cooled to about 30° C. and 33 grams of sulfur were added. Heat was applied and the mixture exothermed to 57° C. The temperature of the mixture was raised to 80° C. and maintained there for a period of about 5 minutes.

The resulting mixture was distilled at reduced pressure and a pot temperature of 75° C. to 80° C. for 30 minutes to remove excess phosphorus chloride, after which the residual aluminum chloride was removed by washing the distilland with ice water. The product was then extracted with monobromobenzene. The monobromobenzene solution was washed several times with water and subsequently phase-separated from the water.

The monobromobenzene solvent was removed by distilling the solution obtained above at reduced pressure. Eighty one and three-tenths (81.3) grams of dark brown, cloudy liquid were obtained.

The product was further purified by distillation, wherein the fraction boiling above 62° C., vapor temperature, at 0.7 millimeter of mercury was retained and redistilled. From the second distillation, the fraction which boiled between 70° C. and 130° C., vapor temperature, at 0.7 millimeter of mercury was retained and further distilled. The distillate collected from the second distillaion had a refractive index of 1.6585 at 25° C., indicating that it was neither monobromobenzene nor phosphorous trichloride which have refractive indices, respectively, of 1.5584 and 1.4600 at 25° C. From the third distillation the fraction which boiled between 110° C. and 122° C., vapor temperature, at a pressure of 0.7 millimeter of mercury was retained and further distilled. From the fourth distillation the fraction which boiled between 115° C. and 126° C., vapor temperature, at 1.0 millimeter of mercury was collected as product. The total weight of this fraction was 23.1 grams.

A microanalysis of the product was compared with the theoretical composition of monobromophenyl phosphorus thiodichloride, as indicated below:

bromophenyl phosphorous thiodichloride, were admixed with 11.7 grams (0.051 gram-mole) of 2,2-bis(4-hydroxyphenyl)propane in a glass vessel equipped with stirrer, thermometer, inert gas purge and reflux condenser.

The mixture was heated and stirred for 38 hours at atmospheric pressure, resulting in the evolution of hydrogen chloride gas. The temperature was elevated from 70° C. to 180° C. during this time.

For an additional 42 hours the mixture was heated and stirred at reduced pressure, 20 to 30 millimeters of mercury. Hyhdrogen chloride gas continued to evolve and the temperature was elevated to 200° C. The heating was then discontinued and the reaction product was allowed to cool.

The solid reaction product was solubilized with a solution of acetone and toluene, and vacuum filtered using a filter aid. The solvent was removed by vacuum distillation and evaporation in a vacuum oven at 90° C. for 12 hours. Eighteen and four-tenths (18.4) grams of brittle, resinous product were obtained. The product had a melting point of 121° C. and was liquid and flowing at 140° C.

*Example V*

The following ingredients were admixed in a flask equipped with a stirrer, thermometer, and condenser:

|  | Grams |
| --- | --- |
| o-Dichlorobenzene (1.0 gram-mole) | 147.0 |
| Phosphorous trichloride (3.0 gram-moles) | 413.0 |
| Aluminum chloride (1.1 gram-moles) | 146.6 |

The above mixture was agitated and heated at reflux temperature, about 85° C. for about 5 hours. Hydrogen chloride gas rapidly evolved during this period. The resulting mixture was cooled to approximately 30° C. and 33.6 grams of sulfur were added. The mixture exothermed to 64° C. The temperature of the mixture was raised to 80° C. and maintained there for a period of about 4 minutes.

The resulting mixture was distilled at reduced pressure and a pot temperature of 65° C. was maintained for 30 minutes to remove excess phosphorous trichloride, after which the residual aluminum chloride was removed by washing the distillant with ice water. The product was then extracted with monochlorobenzene. The monochlorobenzene solution was washed several times with water and subsequently phase-separated from the water.

The monochlorobenzene solvent was removed by distilling the solution obtained above at reduced pressure of 5 to 10 millimeters of mercury and a pot temperature of 80° C. Eighty three and three-tenths (83.3) grams of crude product were obtained.

The product was further purified by distillation, wherein the fraction boiling above 142° C., vapor temperature, at 1.9 millimeters of mercury, was retained and redistilled. From the second distillation the fraction which boiled between 132° C. and 136° C., vapor temperature, at 0.7 millimeter of mercury was retained and

|  | Percent Carbon | Percent Hydrogen | Percent Chlorine | Percent Sulfur | Percent Phosphorous | Percent Bromine |
| --- | --- | --- | --- | --- | --- | --- |
| Theoretical Value | 24.85 | 1.39 | 24.46 | 11.04 | 10.68 | 27.56 |
| Experimental Value | 24.71 | 1.37 | 24.37 | 11.05 | 10.70 | 27.73 |
| Do | 24.78 | 1.45 | 24.46 | 11.27 | 10.59 | 27.60 |

*Example IV*

Sixteen and four-tenths (16.4) grams (0.057 gram-mole) of the product of Example III, identified as monoredistilled. From the third distillation the fraction which boiled at 124° C., vapor temperature, at 0.5 millimeter of mercury, was collected as product.

A microanalysis of the product was compared with the theoretical composition of dichlorophenyl phosphorous thiodichloride, as indicated below:

|                    | Percent Carbon | Percent Hydrogen | Percent Chlorine | Percent Phosphorous | Percent Sulfur |
|---|---|---|---|---|---|
| Theoretical Value  | 25.75 | 1.08 | 50.65 | 11.07 | 11.44 |
| Experimental Value | 26.02 | 1.16 | 50.77 | 11.02 | 11.44 |
| Do                 | 26.04 | 1.26 | 50.93 | 11.23 | 11.59 |

Example VI

Twenty eight and five-tenths (28.5) grams (0.10 grammole) of the product of Example V, identified as dichlorophenyl phosphorous thiodichloride, were admixed with 21.1 grams (0.09 gram-mole) of 2,2-bis(4-hydroxyphenyl)propane in a glass vessel equipped with stirrer, thermometer, inert gas purge and reflux condenser.

The mixture was heated and stirred for 40 hours at atmospheric pressure resulting in the rapid evolution of hydrogen chloride gas. The temperature was elevated from 135° C. to 184° C. during this time.

For an additional 36 hours the mixture was heated and stirred under reduced pressure, 10 millimeters of mercury to 2 millimeters of mercury. Hydrogen chloride gas continued to evolve and the temperature was elevated from 200° C. to 210° C. The heating was then discontinued and the reaction product was allowed to cool.

The solid reaction product was solubilized with toluene and filtered. The toluene solvent was evaporated leaving a solid resinous residue which was melted and flowing at 173° C.

Example VII

Phenyl phosphorous thiodichloride was prepared by the method outlined in Example I utilizing benzene, sulfur and phosphorous trichloride.

Example VIII

Using the method outlined in Example II an interpolymer was prepared from phenyl phosphorous thiodichloride and 2,2-bis(4-hydroxyphenyl)propane.

Example IX

The solid resinous products of Examples IV, VI and VIII were immersed in water at 70° C.–76° C. for a period of 15 hours. The water absorption was as follows.

Sample:                     Water absorption (percent)
  Example IV ------------------------------- 1.48
  Example VI ------------------------------- 0.27
  Example VIII ----------------------------- 2.81

The halogenated phenyl phosphorous thiodichloride polymers exhibited a marked resistance to water absorption. This improved water-resistance is surprising as the increase in molecular weight of the polymer is slight in comparison with the relative increase in water resistance.

The excellent water resistance of the novel polymers described hereinabove make them especially suited for applications wherein poor water resistance is detrimental.

One such application is in the coatings field where coatings, especially for wood surfaces, having poor water resistance are found to be susceptible to mildew.

Another use is in the manufacture of wash-and-wear fabrics where it is very essential that the fabric be composed of fibers having excellent water resistance.

Other haloaryl phosphorous thiodichlorides, such as o-dibromophenyl phosphorous thiodichloride and monochlorotolyl phosphorous thiodichlorides are produced when o-dibromobenzene and monochlorotoluene, respectively, are combined with phosphorous trichloride and sulfur according to the method described in the above examples for the reaction of a halogenated mononuclear aromatic hydrocarbon with phosphorous trichloride and sulfur.

When o-dibromophenyl phosphorous thiodichloride or monochlorotolyl phosphorous thiochlorides are combined with 2,2-bis(4-hydroxyphenyl)propane, using the procedure set forth in the above examples for the reaction of a haloaryl phosphorous thiodichloride with polyhydroxyaryl hydrocarbons, useful resinous polymers are produced.

While specific examples of the invention have been set forth hereinabove, it is not intended to limit the invention solely thereto, but to include all of the variations and modifications thereof which are within the scope of the appended claims.

I claim:

1. An interpolymer of a compound of the structure:

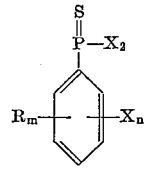

wherein X is a halogen radical selected from the class consisting of chlorine, bromine and fluorine, R is an alkyl group containing from about 1 to 6 carbon atoms, $n$ is a whole number from 1 to 5, and $m$ is a whole number less than 2 and including zero, and wherein the sum of $m$ plus $n$ does not exceed 5, and a non-adjacent polyhydroxy aromatic compound wherein the hydroxy groups are bonded directly to an aromatic nucleus.

2. The interpolymer of claim 1 wherein $m$ equals zero.

3. The interpolymer of claim 1 wherein X is a chlorine radical.

4. The interpolymer of claim 1 wherein X is a bromine radical.

5. An interpolymer of a compound of the structure

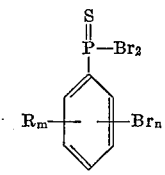

wherein R is an alkyl group containing from about 1 to 6 carbon atoms, $n$ is a whole number from 1 to 5, $m$ is a whole number less than 2 and including 0, and wherein the sum of $n$ plus $m$ does not exceed 5, and 2,2-bis(4-hydroxyphenyl)propane.

6. The copolymer of monodichlorophenyl phosphonyl thiodichloride and 2,2-bis(4-hydroxyphenyl)propane.

7. The copolymer of monobromophenyl phosphonyl thiodichloride and 2,2-bis(4-hydroxyphenyl)propane.

8. The copolymer of dichlorophenyl phosphonyl thiodichloride and 2,2-bis(4-hydroxyphenyl)propane.

9. The copolymer of dibromophenyl phosphonyl thiodichloride and 2,2-bis(4-hydroxyphenyl)propane.

10. The copolymer of monochlorotolyl phosphonyl thiodichloride and 2,2-bis(4-hydroxyphenyl)propane.

References Cited by the Examiner
UNITED STATES PATENTS

| | | | |
|---|---|---|---|
| 2,662,917 | 12/1953 | Jensen | 260—543 |
| 2,900,365 | 8/1959 | Haven | 260—2 |
| 2,926,145 | 2/1960 | McConnell | 260—2 |
| 2,993,929 | 7/1961 | Rattenbury | 260—543 |
| 3,024,278 | 3/1962 | Groenweghe | 260—543 |

OTHER REFERENCES

Denham et al.: J. Organic Chemistry, vol. 23, pages 1298–1301 (1958), see Chem. Abs., vol. 53, 16036d (1959).

Yagupolskii: Chem. Abs., vol. 55, 22196f (1961).

WILLIAM H. SHORT, *Primary Examiner.*

J. R. LIBERMAN, *Examiner.*

J. C. MARTIN, *Assistant Examiner.*